United States Patent [19]
Glover et al.

[11] Patent Number: 5,624,762
[45] Date of Patent: Apr. 29, 1997

[54] RADIATION CURABLE COMPOSITIONS CONTAINING VINYL ETHER FUNCTIONAL POLYORGANOSILOXANES

[75] Inventors: Shedric O. Glover; Valeris J. Bujanowski; Maris J. Ziemelis; Michael W. Skinner; Gary R. Homan, all of Midland; Susan V. Perz, Essexville; John P. Cannady, Midland, all of Mich.

[73] Assignee: Dow Corning Corporation, Midland, Mich.

[21] Appl. No.: 443,520

[22] Filed: May 18, 1995

Related U.S. Application Data

[62] Division of Ser. No. 291,660, Aug. 17, 1994, Pat. No. 5,594,042.

[51] Int. Cl.$^6$ .................... C08L 83/02; C08L 83/07; C08G 77/20; C08G 77/08
[52] U.S. Cl. .................... 428/447; 428/448; 428/451; 428/452; 522/31; 522/99; 528/32; 528/13; 528/23
[58] Field of Search .................... 522/31, 99, 149, 522/172; 428/447, 451, 452; 528/32, 13, 23

[56] References Cited

U.S. PATENT DOCUMENTS

| | | | |
|---|---|---|---|
| 4,108,747 | 8/1978 | Crivello | 522/31 |
| 4,617,238 | 10/1986 | Crivello et al. | 428/452 |
| 5,059,669 | 10/1991 | Hamada et al. | 522/99 |
| 5,270,423 | 12/1993 | Brown et al. | 528/15 |

FOREIGN PATENT DOCUMENTS

| | | | |
|---|---|---|---|
| 0462389 | 5/1991 | European Pat. Off. | C08G 77/18 |
| 0562922 | 3/1993 | European Pat. Off. | C09D 183/06 |
| 4142327 | 12/1991 | Germany | C07F 7/08 |

OTHER PUBLICATIONS

PCT/EP93/01115; Date May 6, 1993; "Siloxane Copolymers Having Vinyloxy Groups, Their Preparation and Use" Herzig, Shrockenbauer, Taching, Rengstl, Zoglerberg, Reischach.

*Primary Examiner*—Susan W. Berman
*Attorney, Agent, or Firm*—Timothy J. Troy

[57] ABSTRACT

The present invention relates to compositions comprising vinyl ether functional siloxanes and aromatic iodonium salt or aromatic sulfonium salt photoinitiators which cure upon exposure to ultraviolet or electron beam radiation. The present invention further relates to use of these compositions in pressure sensitive release applications.

28 Claims, No Drawings

RADIATION CURABLE COMPOSITIONS CONTAINING VINYL ETHER FUNCTIONAL POLYORGANOSILOXANES

This is a divisional of U.S. patent application Ser. No. 08/291,660 filed on Aug. 17, 1994, now U.S. Pat. No. 5,594,042.

BACKGROUND OF THE INVENTION

The present invention relates to radiation curable compositions. More particularly, the present invention relates to compositions containing vinyl ether functional siloxanes and an aromatic iodonium salt or aromatic sulfonium salt photoinitiator which are curable upon exposure to actinic radiation.

Radiation curable compositions which contain alkenyl ether functional organosilicon compounds have been described in the art. For example, U.S. Pat. No. 4,617,238 to Crivello discloses and claims a photopolymerizable composition comprising (a) an organopolysiloxane having at least one Si-bonded vinyloxy functional group of the formula $H_2C=CH-O-G-$, where G is alkylene (such as propylene) or alkylene interrupted by at least one divalent heteroradical selected from $-O-$, divalent phenylene, or substituted divalent phenylene, or combination of such heteroradicals, and (b) an onium salt catalyst. The '238 patent also describes a method wherein the vinyl ether group is introduced into the organopolysiloxane by addition (hydrosilylation) of compounds with an allyl and a vinyl ether group to an SiH group of the organopolysiloxane in the presence of a platinum catalyst. In the method of the '238 patent, only the allyl group is added to the SiH group while the vinyl ether group is preserved and thus only one vinyl ether group for each SiH group can be incorporated into the siloxane molecule at any given time.

European Patent Publication No. 0462389 teaches thermosetting organopolysiloxanes with oxyalkylene vinyl ether groups bonded by SiOC groups and the vinyl groups may be substituted by alkyl radicals. EPO'389 also teaches a method for the preparation of these compounds and their application as photochemically thermosetting polysiloxanes in encapsulating compounds, as non-stick coating compounds for flat carriers or as modified additives in compounds which can be thermoset radically, cationically or by UV or electron radiation.

German Patent Publication No. DE 4142327 discloses iodonium salts which are suitable as photoinitiators for polymerizing cationically polymerizable organic substances such as epoxides, vinyl ethers, epoxy group containing organopolysiloxanes, and alkenyloxy group (such as vinyloxy or propenyloxy groups) containing organopolysiloxanes.

Brown et al., in U.S. Pat. No. 5,270,423 discloses organosilicon compounds with a siloxane portion of the general formula $-OR'OCH=CHR''$ linked via an SiOC bond wherein R' is a divalent hydrocarbon radical and R'' is hydrogen or an alkyl radical which are useful in radiation curable compositions, in which they are mixed with an initiator. The compositions are particularly useful in UV radiation curable coatings.

However, none of the references cited hereinabove disclose the particular diaryliodonium salt catalysts of this invention in combination with the unique vinyl ether functional polysiloxanes of the instant invention.

SUMMARY OF THE INVENTION

The present invention thus relates to a curable composition comprising vinylether functional polysiloxane compounds in combination with a photoinitiator selected from the group consisting of diaryliodonium salts of sulfonic acids, triarylsulfonium salts of sulfonic acids, diaryliodonium salts of boronic acids, and triarylsulfonium salts of boronic acids.

The present invention further relates to a method of making a cured coating, comprising the steps of (I) applying a composition comprising (A) a vinylether functional polysiloxane compound and (B) a photoinitiator selected from the group consisting of diaryliodonium salts of sulfonic acids, triarylsulfonium salts of sulfonic acids, diaryliodonium salts of boronic acids, and triarylsulfonium salts of boronic acids to a solid substrate to form a coating, and (II) exposing the coating to an energy source selected from the group consisting of (i) actinic radiation and (ii) actinic radiation in combination with heat in an amount sufficient to cure the coating.

It is an object of the present invention to provide novel UV or EB curable coating compositions suitable for pressure sensitive adhesive release applications.

It is also an object of the present invention to produce silicone vinyl ether copolymers or oligomers which are curable by addition of an aromatic iodonium salt or aromatic sulfonium salt photoinitiator and exposure to UV (ultraviolet) or EB (electron beam) radiation.

It is a further object of this invention to provide UV-curable silicone compositions which may be catalyzed by a variety of aromatic iodonium salt or aromatic sulfonium salt curing catalysts.

It is a further object of this invention to provide novel UV curable release coating compositions having especially rapid cure rates.

It is another object of the present invention to provide substrates which have been coated with the novel coating compositions of this invention and then have been subsequently cured.

These and other features, objects, and advantages of the present invention will be apparent upon consideration of the following detailed description of the invention.

DETAILED DESCRIPTION OF THE INVENTION

The present invention relates to a curable coating composition comprising

A) a siloxane compound having the general formula:

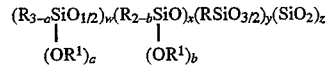

wherein R is a monovalent hydrocarbon radical or halohydrocarbon radical having from 1 to 20 carbon atoms, $R^1$ is selected from the group consisting of monovalent hydrocarbon or halohydrocarbon radicals having from 1 to 8 carbon atoms and a group having its formula selected from the group consisting of (i) $-R^2OCH=CH_2$ and (ii) $-R^2Si[OR^2OCH=CH_2]_{3-c}R_c$ wherein $R^2$ is a divalent hydrocarbon or halohydrocarbon radical having from 1 to 20 carbon atoms, c has a value of 0 to 2, R is as defined above, w has a mole percent of from greater than 0 to 100, x has a mole percent of from 0 to less than 100, y has a mole percent of from 0 to less than 100, z has a mole percent of from 0 to less than 100, a is an integer of from 0 to 3, b is an integer of from 0 to 2, the sum of w+x+y+z being equal to 100 mole percent, with the proviso that at least one ≡SiOR²OCH═CH₂ group or ≡SiOR²Si[OR²OCH═CH₂]₃₋cRc group exists in each compound; and (B) a photoinitiator selected from the group consisting of diaryliodonium salts of sulfonic acids, triarylsulfonium salts of sulfonic acids, diaryliodonium salts of boronic acids, and triarylsulfonium salts of boronic acids.

In the formula shown immediately above each R denotes a monovalent hydrocarbon radical having from 1 to 20 carbon atoms. Monovalent hydrocarbon radicals include alkyl radicals, such as methyl, ethyl, propyl, butyl, hexyl, octyl, and decyl; cycloaliphatic radicals, such as cyclohexyl; aryl radicals, such as phenyl, tolyl, and xylyl; aralkyl radicals, such as benzyl and phenylethyl, and olefinic hydrocarbon radicals, such as vinyl, allyl, methallyl, butenyl, and hexenyl, octenyl, cyclohexenyl and styryl. Alkenyl radicals are preferably terminally unsaturated. Highly preferred monovalent hydrocarbon radicals in the compositions of this invention are methyl and phenyl. Monovalent halohydrocarbon radicals include any monovalent hydrocarbon radical noted above which has at least one of its hydrogen atoms replaced with a halogen, such as fluorine, chlorine, or bromine. Preferred monovalent halohydrocarbon radicals have the formula $C_nF_{2n+1}CH_2CH_2$— wherein the subscript n has a value of from 1 to 8, such as, for example, $CF_3CH_2CH_2$— and $C_4F_9CH_2CH_2$—. The several R radicals can be identical or different, as desired.

The group $R^1$ in the compositions of the present invention is a monovalent hydrocarbon or halohydrocarbon radical having from 1 to 8 carbon atoms which include alkyl radicals such as methyl, ethyl, propyl, butyl, hexyl, or octyl or a halohydrocarbon radical as described above or $R^1$ is a group having its formula selected from the group consisting of (i) —R²OCH═CH₂ and (ii) —R²Si[OR²OCH═CH₂]₃₋cRc wherein $R^2$ is a divalent hydrocarbon or halohydrocarbon radical having from 1 to 20 carbon atoms, c has a value of 0 to 2, and R is a monovalent hydrocarbon or halohydrocarbon radical having from 1 to 20 carbon atoms as defined above. Divalent hydrocarbon radicals suitable as $R^2$ are exemplified by alkylene radicals, such as methylene, ethylene, hexylene, trimethylene, 2-methyltrimethylene, pentamethylene, hexamethylene, 3-ethyl-hexamethylene, octamethylene, —CH₂(CH₃)CH—, —(CH₂)₄—, —CH₂CH(CH₃)CH₂—, and —(CH₂)₁₈—; cycloalkylene radicals such as cyclohexylene and cyclohexyldimethylene; arylene radicals such as phenylene, and combinations of divalent hydrocarbon radicals such as benzylene, i.e. —C₆H₄CH₂—. Examples of suitable divalent halohydrocarbon radicals include any divalent hydrocarbon radical wherein one or more hydrogen atoms have been replaced by halogen, such as fluorine, chlorine or bromine. Preferably divalent halohydrocarbon radicals have the formula —CH₂CH₂C$_n$F$_{2n}$CH₂CH₂— wherein n has a value of from 1 to 10 such as for example —CH₂CH₂CF₂CF₂CH₂CH₂—. The divalent hydrocarbon radicals of $R^2$ can be the same or different as desired. Preferably $R^2$ is an alkylene radical having from 1 to 8 carbon atoms such as methylene, ethylene, propylene, butylene, hexylene, or cyclohexyldimethylene.

The siloxane copolymer (A) of the present invention thus is comprised of siloxane units of the formula

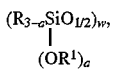

siloxane units of the formula

siloxane units of the formula $(RSiO_{3/2})_y$, and siloxane units of the formula $(SiO_2)_z$ with the molar ratios defined in the formula hereinabove.

It is preferred in the instant invention that w has a mole percent of from 5 to 90, x has a mole percent of from 0 to 75, y has a mole percent of from 0 to 40, and z has a mole percent of from 0 to 10. It is further preferred that the molecular weight of said composition be controlled to deliver a solvent-free viscosity of from 20 cps to 5000 cps at 22° C.

The vinylether functional polysiloxanes of the instant invention were prepared by the method described in our copending application for U.S. patent application Ser. No. 08/063,206, filed May 18, 1993, and assigned to the same assignee as the present application or by the method described in U.S. Pat. No. 5,270,423, issued Dec. 14, 1993 and assigned to the same assignee as the present application, both incorporated herein by reference to teach how to make the vinylether functional polysiloxanes employed in this invention.

It is preferred for purposes of this invention that from 90 to 99.9 weight percent of the siloxane compound (A) be used in the compositions of the invention, and it is highly preferred that from 97 to 99 weight percent of this compound be employed, said weight percent being based on the total weight of the composition.

Component (B) in the compositions of the present invention is a photoinitiator selected from the group consisting of diaryliodonium salts of sulfonic acids, triarylsulfonium salts of sulfonic acids, diaryliodonium salts of boronic acids, and triarylsulfonium salts of boronic acids. Preferred diaryliodonium salts of sulfonic acid in the compositions of the present invention are selected from diaryliodonium salts of perfluoroalkylsulfonic acids and diaryliodonium salts of aryl sulfonic acids. Preferred diaryliodonium salts of perfluoroalkylsulfonic acids include diaryliodonium salts of perfluorobutanesulfonic acid, diaryliodonium salts of perfluoroethanesulfonic acid, diaryliodonium salts of perfluorooctanesulfonic acid, and diaryliodonium salts of trifluoromethane sulfonic acid. Preferred diaryliodonium salts of aryl sulfonic acids include diaryliodonium salts of para-toluene sulfonic acid, diaryliodonium salts of dodecylbenzene sulfonic acid, diaryliodonium salts of benzene sulfonic acid, and diaryliodonium salts of 3-nitrobenzene sulfonic acid.

Preferred triarylsulfonium salts of sulfonic acid in the compositions of the present invention are selected from triarylsulfonium salts of perfluoroalkylsulfonic acids and triarylsulfonium salts of aryl sulfonic acids. Preferred triarylsulfonium salts of perfluoroalkylsulfonic acids include triarylsulfonium salts of perfluorobutanesulfonic acid, triarylsulfonium salts of perfluoroethanesulfonic acid, triarylsulfonium salts of perfluoro-octanesulfonic acid, and triarylsulfonium salts of trifluoromethane sulfonic acid. Preferred triarylsulfonium salts of aryl sulfonic acids include triarylsulfonium salts of para-toluene sulfonic acid, triarylsulfonium salts of dodecylbenzene sulfonic acid, triarylsulfonium salts of benzene sulfonic acid, and triarylsulfonium salts of 3-nitrobenzene sulfonic acid.

Preferred diaryliodonium salts of boronic acids, and triarylsulfonium salts of boronic acids are compounds such as those disclosed in European Patent Application No. 0562922. Preferred diaryliodonium salts of boronic acids include diaryliodonium salts of perhaloarylboronic acids and preferred triarylsulfonium salts of boronic acids are the triarylsulfonium salts of perhaloarylboronic acid.

Preferred diaryliodonium salts for use as Component (B) in the compositions of the present invention is a diaryliodonium salt having the general formula $R^i{}_a ArI^+ ArR^{ii}{}_b X^-$ wherein $R^i$ is selected from the group consisting of monovalent hydrocarbon or halohydrocarbon radicals free of aliphatic unsaturation having from 1 to 40 carbon atoms, halogen atoms, $NO_2$, CN, COOH, $SO_3H$, alkoxy radicals, nitro substituted groups, nitrile substituted groups, carboxylic acid substituted groups, sulfonic acid substituted groups, and alkoxy substituted groups. $R^{ii}$ is selected from the group consisting of monovalent hydrocarbon radicals free of aliphatic unsaturation and having from 1 to 40 carbon atoms, alkoxy substituted groups, arylalkoxy radicals, aryloxy radicals, and halogen atoms. Ar denotes arene radicals having from 6 to 40 carbon atoms, a has a value of from 0 to 10, b has a value of from 0 to 10, and $X^-$ is an anion selected from the group consisting of perfluoroalkylsulfonic acid anions, hexahalometallic acid anions, hexahalometalloidic acid anions, tetrahaloboronic acid anions, tetrakis (perfluoroaryl)boronic acid anions, and tetrakisperfluoroalkylsulfonatoboronic acid anions.

Ar in the formula hereinabove denotes an aromatic (arene) radical having the formula $C_n H_{(n/2+2)}$ or of formula $C_m H_{(m/2+1)}$, wherein n has a value of 6, 10, 14, 18, 22, 26, 30, 34 or 38 and m has a value of 16, 20, 24, 28, 32, 36, or 40.

The group $R^i$ can be a monovalent hydrocarbon or halohydrocarbon radical free of aliphatic unsaturation having from 1 to 40 carbon atoms. Monovalent hydrocarbon radicals free of aliphatic unsaturation which are suitable as $R^i$ include alkyl radicals such as methyl, ethyl, propyl, butyl, hexyl, octyl, and decyl, cycloaliphatic radicals such as cyclohexyl, aryl radicals such as phenyl, tolyl, and xylyl, and arylalkyl radicals such as benzyl and phenylethyl. Monovalent hydrocarbon radicals suitable as $R^i$ also include arene radicals having from 6 to 40 carbon atoms such as naphthyl ($C_{10}H_7$), anthracenyl or phenanthracenyl ($C_{14}H_9$), pyrenyl ($C_{16}H_9$), napthacenyl, 9,10-benzophenanthrenyl, chrysenyl, 1,2-benzanthracenyl, or 3,4-benzophenanthrenyl ($C_{18}H_{11}$), 3,4-benzopyrene or perylenyl ($C_{20}H_{11}$), 1,2,3,4-dibenzanthracenyl, 1,2,5,6-dibenzanthracenyl, 1,2,6,7-dibenzoanthracenyl, 1,2,7,8-dibenzanthracenyl, 1,2,6,7-dibenzophenanthracenyl, 1,2,7,8-dibenzophenanthracenyl, pentacenyl, or picenyl ($C_{22}H_{13}$), coronenyl ($C_{24}H_{11}$), 1,2,4,5-dibenzopyrene ($C_{24}H_{13}$), and hexacenyl ($C_{26}H_{15}$). Arene radicals having up to 40 carbon atoms which are suitable as $R^i$ also include combinations of the above radicals attached to one another such as phenylhexadecenyl ($C_{32}H_{19}$) or anthracenylhexacenyl ($C_{40}H_{23}$).

The group $R^i$ can also be a halogen atom, or a radical selected from $NO_2$, CN, COOH, and $SO_3H$. Halogen atoms suitable as R' include fluorine, chlorine, and bromine. Alkoxy radicals suitable as $R^i$ include radicals such as methoxy, ethoxy, propoxy, and butoxy radicals. Nitro substituted groups suitable as $R^i$ include groups such as $3—O_2N—C_6H_4$ or $4—Cl,3—O_2N—C_6H_3$. Nitrile substituted groups suitable as $R^i$ are exemplified by groups such as $4—NC—C_6H_4$, $1—NC—C_{10}H_7$, or $2—NC—C_{10}H_7$.

Carboxylic acid substituted groups suitable as $R^i$ are exemplified by groups such as $4—HOOC—C_6H_4$ or $3—HOOC—C_6H_4$. Sulfonic acid substituted groups suitable as $R^i$ are exemplified by groups such as $4—HO_3S—C_6H_4$ or $3—HO_3S—C_6H_4$. The alkoxy substituted groups suitable as $R^i$ include groups such as $4—CH_3O—C_6H_4$, $4—C_2H_5O—C_6H_4$, $2—CH_3O—C_6H_4$, and $2—C_2H_5O—C_6H_4$.

The monovalent hydrocarbon radicals free of aliphatic unsaturation having from 1 to 40 carbon atoms (including arene radicals having from 6 to 40 carbon atoms), alkoxy substituted groups, and halogen atoms suitable as $R^{ii}$ are as delineated above for $R^i$ including preferred embodiments thereof. Arylalkoxy radicals suitable as $R^{ii}$ include radicals such as benzyloxy and phenylethyloxy. Aryloxy radicals suitable as $R^{ii}$ are exemplified by radicals such as phenoxy and napthoxy.

Ar denotes arene radicals having from 6 to 40 carbon atoms. Arene radicals suitable as Ar are exemplified by phenyl ($C_6H_5$), naphthyl ($C_{10}H_7$), anthracenyl or phenanthracenyl ($C_{14}H_9$), pyrenyl ($C_{16}H_9$), napthacenyl, 9,10-benzophenanthrenyl, chrysenyl, 1,2-benzanthracenyl, or 3,4-benzophenanthrenyl ($C_{18}H_{11}$), 3,4-benzopyrene or perylenyl ($C_{20}H_{11}$), 1,2,3,4-dibenzanthracenyl, 1,2,5,6-dibenzanthracenyl, 1,2,6,7-dibenzoanthracenyl, 1,2,7,8-dibenzanthracenyl, 1,2,6,7-dibenzophenanthracenyl, 1,2,7,8-dibenzophenanthracenyl, pentacenyl, or picenyl ($C_{22}H_{13}$), coronenyl ($C_{24}H_{11}$), 1,2,4,5-dibenzopyrene ($C_{24}H_{13}$), hexacenyl ($C_{26}H_{15}$), and combinations of thence radicals attached to one another such as phenylhexadecenyl ($C_{32}H_{19}$) or anthracenylhexacenyl ($C_{40}H_{23}$).

The anion $X^-$ can be an anion selected from the group consisting of perfluoroalkylsulfonic acid anions, hexahalometallic acid anions, hexahalometalloidic acid anions, tetrahaloboronic acid anions, tetrakis(perfluoroaryl)boronic acid anions, and tetrakisperfluoroalkylsulfonatoboronic acid anions. Perfluoroalkylsulfonic acid anions are exemplified by perfluorobutanesulfonic acid anions, perfluoroethanesulfonic acid anions, perfluoro-octanesulfonic acid anions, or trifluoromethanesulfonic acid anions. Hexahalometallic acid anions include anions such as $SbF_6^-$, $AsF_6^-$, $SbCl_6^-$, and $AsCl_6^-$, hexahalometalloidic acid anions include anions such as $PF_6^-$ and $PCl_6^-$, tetrahaloboronic acid anions include anions such as $BF_4^-$, $BCl_4^-$, and $BBr_4^-$, tetrakis perfluoroaryl boronic acid anions are exemplified by $B(C_6H_5)_4^-$ and $B(C_{10}F_7)_4^-$, and tetrakisperfluoroalkylsulfonatoboronic acid anions include anions such as $B(O_3SCF_3)_4^-$, $B(O_3SC_2F_5)_4^-$, and $B(O_3SC_4F_9)_4^-$. It is preferred that $X^-$ is trifluoromethanesulfonate.

Also preferred as diaryliodonium salts for use as Component (B) in the compositions of the present invention is a diaryliodonium salt having the general formula:

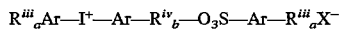

wherein $R^{iii}$ is selected from the group consisting of monovalent hydrocarbon or halohydrocarbon radicals free of aliphatic unsaturation and having from 1 to 20 carbon atoms, halogen atoms, $NO_2$, CN, COOH, $SO_3H$, alkoxy radicals, nitro substituted groups, nitrile substituted groups, carboxylic acid substituted groups, sulfonic acid substituted groups, alkoxy substituted groups, and Ar denotes arene radicals having from 6 to 40 carbon atoms, $R^{iv}$ is selected from the group consisting of alkoxy radicals or aryloxy radicals, a has a value of from 0 to 5, b has a value of from 0 to 5, and $X^-$ is an aryl sulfonate anion. The diaryliodonium tosylates of the invention may be prepared, for example, by the method of Neilands and Karele, Journal of Organic Chemistry, U.S.S.R., (1970), v.6, p. 889.

The monovalent hydrocarbon or halohydrocarbon radicals free of aliphatic unsaturation and having from 1 to 20 carbon atoms, halogen atoms, alkoxy radicals, nitro substituted groups, nitrile substituted groups, carboxylic acid substituted groups, sulfonic acid substituted groups, alkoxy substituted groups, arene radicals having from 6 to 40 carbon atoms, alkoxy radicals, and aryloxy radicals of $R^{iii}$ and $R^{iv}$ are as described hereinabove including preferred embodiments thereof. The group $R^{iii}$ can be the same or different as desired.

Preferred aryl sulfonate anions include aryl sulfonates (tosylates) such as p-toluenesulfonate, 4-methylphenylsulfonate $(4-(CH_3)C_6H_4SO_3^-)$, benzenesulfonate $(C_6H_5SO_3^-)$, dodecylbenzenesulfonate $(4-(C_{12}H_{25})C_6H_4SO_3^-)$, and 3-nitrobenzenesulfonate $(3-(NO_2)C_6H_4SO_3)$.

The photoinitiator compounds may be present in any proportions which effect curing in the method of this invention. For purposes of the present invention, preferably the amount of photoinitiator is from 0.1 to 10 percent by weight based on the total weight of the composition, and it is highly preferred to use between 1 and 5 percent by weight of the photoinitiator compound based on the total weight of the composition.

The curable coating composition of the present invention can further comprise a reactive diluent such as an organic vinyl ether compound having the formula $(CH=CHOR^3)_dCR^4{}_{4-d}$ wherein $R^3$ is a divalent hydrocarbon or halohydrocarbon radical having from 1 to 20 carbon atoms, $R^4$ is a monovalent hydrocarbon or halohydrocarbon radical having from 1 to 20 carbon atoms or hydrogen, and d has a value of 1 to 3. The divalent hydrocarbon and halohydrocarbon radicals are as delineated above for the vinyl ether functional organopolysiloxane, including preferred embodiments thereof. The monovalent hydrocarbon radicals are as delineated, above including preferred embodiments thereof.

For purposes of the present invention, the amount of reactive diluent can be from 0 to 30 percent by weight based on the total weight of the composition, and it is preferred to use between 3 and 15 percent by weight based on the total weight of the composition.

The curable coating compositions of the present invention can further comprise an anchorage additive compound having the formula $R^5{}_{4-e}Si(OR^6)_e$ wherein $R^5$ is selected from the group consisting of a monovalent hydrocarbon or halohydrocarbon radical having from 1 to 20 carbon atoms and a group having its formula selected from the group consisting of (a) —$OR^7OCH=CH_2$ and (b) —$R^7OR^7OCH=CH_2$ wherein $R^7$ is a divalent hydrocarbon or halohydrocarbon radical having from 1 to 20 carbon atoms, $R^6$ is a monovalent hydrocarbon radical having from 1 to 8 carbon atoms, e has a value of from 1 to 3, with the proviso that at least one $\equiv SiOR^7OCH=CH_2$ group or $\equiv SiR^7OR^7OCH=CH_2$ group exists in each compound. It is preferable that $R^6$ is an alkyl radical having from 1 to 3 carbon atoms.

For purposes of the present invention, preferably the amount of anchorage additive is from 0.1 to 10 percent by weight based on the total weight of the composition, and it is highly preferred to use between 1 and 5 percent by weight based on the total weight of the composition.

When x has a value of 0 in siloxane compound (A) in the compositions of the instant invention, (A) is a resin. When x has a value of 0 in siloxane compound (A) hereinabove, the compositions of the present invention can further comprise a linear organopolysiloxane compound having the general formula:

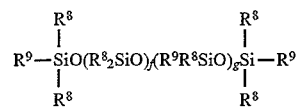

wherein $R^8$ is a monovalent hydrocarbon radical having from 1 to 20 carbon atoms, $R^9$ is $R^8$ or is group having its formula selected from the group consisting of (i) —$OR^{10}OCH=CH_2$ and (ii) —$R^{10}Si[OR^{10}OCH=CH_2]_{3-h}R^{11}{}_h$ wherein $R^{10}$ is a divalent hydrocarbon or halohydrocarbon radical having from 1 to 20 carbon atoms, h has a value of 0 to 2, $R^{11}$ is a monovalent hydrocarbon radical having from 1 to 20 carbon atoms, f has a value of 0 to 5000, g has a value of 0 to 800, with the proviso that at least one $\equiv SiOR^{10}OCH=CH_2$ group or $\equiv SiR^{10}Si[OR^{10}OCH=CH_2]_{3-h}R^{11}{}_h$ group exists in each compound. The divalent hydrocarbon radicals of $R^{10}$ are as delineated above including preferred embodiments thereof. The group $R^{10}$ can be the same or different as desired. It is preferred for purposes of the instant invention that $R^8$ is methyl and $R^{10}$ is selected from the group consisting of methylene, ethylene, propylene, butylene, hexylene, and cyclohexyldimethylene. It is highly preferred that $R^{10}$ is ethylene or butylene.

It is preferred for purposes of this invention that from 95 to 99.5 weight percent of the linear organopolysiloxane compound described above be used in the compositions of the invention, and it is highly preferred that from 97 to 99 weight percent of this compound be employed, said weight percent being based on the total weight of the composition.

The present invention further relates to a method of making a cured coating, comprising the steps of (I) applying a composition comprising (A) a siloxane compound having the general formula:

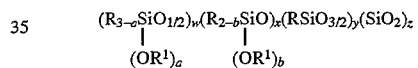

wherein R, $R^1$, w, x, y, z, a, and b are as defined above including preferred embodiments thereof and (B) a photoinitiator selected from the group consisting of diaryliodonium salts of sulfonic acids, triarylsulfonium salts of sulfonic acids, diaryliodonium salts of boronic acids, and triarylsulfonium salts of boronic acids to a solid substrate to form a coating, and (II) exposing the coating to an energy source selected from the group consisting of (i) actinic radiation and (ii) actinic radiation in combination with heat in an amount sufficient to cure the coating.

Step (I) in the method of the present invention comprises applying a composition comprising (A) a vinylether functional polysiloxane compound and (B) a photoinitiator selected from the group consisting of diaryliodonium salts of sulfonic acids, triarylsulfonium salts of sulfonic acids, diaryliodonium salts of boronic acids, and triarylsulfonium salts of boronic acids to a solid substrate to form a coating. The siloxane compound and photoinitiator are as delineated above for the compositions of the present invention including preferred embodiments thereof. The composition employed in step (I) of the method of this invention can further comprise the reactive diluent, anchorage additive compound, and linear organopolysiloxane compound as delineated above for the compositions of the present invention. The reactive diluent, anchorage additive compound, and linear organopolysiloxane compound are as delineated above for the compositions of the present invention including amounts and preferred embodiments thereof.

The method of this invention can be completed by mixing the materials described hereinabove and any optional components in any order, using any suitable mixing means, such as a spatula, a drum roller, a mechanical stirrer, a three-roll mill, a sigma blade mixer, a bread dough mixer, and a two-roll mill. In the method of this invention, the coating may be applied by any suitable manner known in the art, such as by spreading, brushing, extruding, spraying, gravure, kiss-roll and air-knife.

In a preferred embodiment of the instant method the solid substrate is a flexible sheet material such as paper, polyolefin film, polyolefin-coated paper, or foil. Other suitable solid substrates that can be coated by the method of this invention include other cellulosic materials such as wood, cardboard and cotton; metallic materials such as aluminum, copper, steel and silver; siliceous materials such as glass and stone; and synthetic polymer materials such as polyolefins, polyamides, polyesters and polyacrylates. As to form, the solid substrate can be substantially sheet-like, such as a peelable release liner for pressure sensitive adhesive; a fabric or a foil; or substantially three-dimensional in form.

Step (II) in this method of the present invention comprises exposing the coating to an energy source selected from the group consisting of (i) actinic radiation and (ii) actinic radiation in combination with heat in an amount sufficient to cure the coating. By actinic radiation it is meant ultraviolet light; electron beam radiation; or alpha-, beta-, gamma- or x-rays. By heat it is meant infrared radiation, hot-air, microwave radiation, etc. Of course actinic radiation is frequently accompanied by heat and the use of a combination of the two falls within the scope and spirit of the present invention. Herein the term "cure", as applied to the composition and method of this invention, generally denotes a chemical change which leads to a change in the state of the composition from a liquid to a solid. Curing itself may be achieved in any of the known ways, including passing a coated substrate under the desired source of radiation, for example a UV lamp, at a predetermined rate and exposing a completely coated substrate to radiation by switching on the required energy source for a predetermined time.

In a preferred embodiment of the method of this invention, a flexible sheet material, such as paper, metal foil or tapestock, is coated with a thin coating of the liquid curable composition, preferably in a continuous manner and the thus-coated material is then heated and/or irradiated to rapidly cure the coating, to provide a sheetlike material bearing on at least one surface thereof an adhesive-releasing coating. The adhesive-releasing coating is subsequently brought into contact with a pressure sensitive adhesive, preferably in an in-line manner, to form an article having a peelable, i.e. releasable, adhesive/coating interface. Examples of such an article include, adhesive labels having a peelable backing, adhesive tape in roll form and adhesive packaged in a strippable container. The pressure sensitive adhesive can be non-silicone-based, such as the well-known acrylic or rubber types or silicone-based, such as the peroxide- or platinum-curable polydiorganosiloxane-based adhesives.

The methods and compositions of this invention are also applicable to adhesive materials other than pressure sensitive adhesives. Examples of said adhesive materials include foods, asphalt and gum polymers. The compositions of the present invention are useful as release coatings for pressure sensitive adhesives, as protective coatings and decorative coatings.

The compositions prepared in the method of this invention and the curable coating compositions of this invention can contain any optional components such as photosensitizers, high release additives, reinforcing and extending fillers, hydrocarbons and halohydrocarbons, colorants, dyes, preservatives, fragrances, stabilizers, adhesion modifiers, adhesive-release modifiers, diluents, etc.

The following examples are disclosed to further teach, but not limit, the invention which is properly delineated by the appended claims. All amounts (parts and percentages) are by weight unless otherwise indicated. The structures presented in the examples are expressed in mole percents unless otherwise indicated.

Cure time for a composition means the time interval required for the composition, when coated onto S2S kraft paper or polypropylene film, at a thickness of 1 pound silicone per ream of paper or film, to attain the no smear, no migration, no rub-off condition.

In the examples hereinbelow, HDDVE denotes hexanedioldivinyl ether, TMPTVE denotes trimethylolpropane trivinyl ether, and HBVE denotes hydroxybutylvinylether.

Example 1

To a suitable container 0.20 gms of tolyl (didodecylphenyl) iodonium triflate (trifluoromethanesulfonate), referred to as the "triflate" catalyst hereinafter, and 10 gms of a silicone vinyl ether copolymer containing approximately 17% by weight vinyl ether and having the general formula

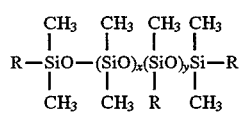

wherein R denotes the group —$(CH_2)_2Si[O(CH_2)_4OCH=CH_2]_3$ and having a viscosity of about 1200 centipoise was mixed thoroughly. It was coated onto biaxially oriented polypropylene at a coating weight of approximately 0.7 grams(g)/m². Curing was carried out on a Fusion UV processor equipped with a H-bulb with an irradiating power of 600 W/in² (Watts per inch squared). Cure time was determined as line speed to no silicone transfer to an acrylic adhesive. The resulting coating cured at a speed of about 350 ft/min.

Example 2

About 0.5 grams of a reactive diluent (HDDVE) was added to about 9.5 grams of the silicone vinylether copolymer of example 1 and mixed thoroughly. Next about 0.20 grams of the triflate catalyst was added to this mixture and the resulting mixture was stirred thoroughly. This mixture was then coated on a biaxially orientated polypropylene at a coating weight of approximately 0.7 g/m². Curing was carried out on a Fusion UV irradiator equipped with a H-Bulb with an irradiating power of 600 W/in². Cure time was determined as line speed to no silicone migration to an acrylic adhesive. The resulting coating cured at a speed of about 175 ft/min.

Example 3

About 1.0 grams of a reactive diluent (HDDVE) was added to about 9.0 grams of the silicone vinylether copolymer of example 1 and mixed thoroughly. Next about 0.20 grams of the triflate catalyst was added to this mixture and the resulting mixture was stirred thoroughly. This mixture was then coated on a biaxially orientated polypropylene at a coating weight of approximately 0.7 g/m². curing was carried out on a Fusion UV irradiator equipped with a H-Bulb with an irradiating power of 600 W/in². Cure time was determined as line speed to no silicone migration to an acrylic adhesive. The resulting coating cured at a speed of about 375 ft/min.

Example 4

About 0.5 grams of a reactive diluent (TMPTVE) was added to about 9.5 grams of the silicone vinylether copolymer of example 1 and mixed thoroughly. Next about 0.20 grams of the triflate catalyst was added to this mixture and the resulting mixture was stirred thoroughly. This mixture was then coated on a biaxially orientated polypropylene at a coating weight of approximately 0.7 g/m$^2$. Curing was carried out on a Fusion UV irradiator equipped with a H-Bulb with an irradiating power of 600 W/in$^2$. Cure time was determined as line speed to no silicone migration to an acrylic adhesive. The resulting coating cured at a speed of about 390 ft/min.

Example 5

About 1.0 grams of a reactive diluent (TMPTVE) was added to about 9.0 grams of the silicone vinylether copolymer of example 1 and mixed thoroughly. Next about 0.20 grams of the triflate catalyst was added to this mixture and the resulting mixture was stirred thoroughly. This mixture was then coated on a biaxially orientated polypropylene at a coating weight of approximately 0.7 g/m$^2$. Curing was carried out on a Fusion UV irradiator equipped with a H-Bulb with an irradiating power of 600 W/in$^2$. Cure time was determined as line speed to no silicone migration to an acrylic adhesive. The resulting coating cured at a speed of about 465 ft/min.

Example 6

About 0.5 grams of a reactive diluent (HBVE) was added to about 9.5 grams of the silicone vinylether copolymer of example 1 and mixed thoroughly. Next about 0.20 grams of the triflate catalyst was added to this mixture and the resulting mixture was stirred thoroughly. This mixture was then coated on a biaxially orientated polypropylene at a coating weight of approximately 0.7 g/m$^2$. Curing was carried out on a Fusion UV irradiator equipped with a H-Bulb with an irradiating power of 600 W/in$^2$. Cure time was determined as line speed to no silicone migration to an acrylic adhesive. The resulting coating cured at a speed of about 100 ft/min.

Example 7

About 1.0 grams of a reactive diluent (HBVE) was added to about 9.0 grams of the silicone vinylether copolymer of example 1 and mixed thoroughly. Next about 0.20 grams of the triflate catalyst was added to this mixture and the resulting mixture was stirred thoroughly. This mixture was then coated on a biaxially orientated polypropylene at a coating weight of approximately 0.7 g/m$^2$. Curing was carried out on a Fusion UV irradiator equipped with a H-Bulb with an irradiating power of 600 W/in$^2$. Cure time was determined as line speed to no silicone migration to an acrylic adhesive. The resulting coating cured at a speed of about 75 ft/min.

Example 8

About 5.0 grams of a vinyl ether functional silicone resin having the general formula:

$$(R_{3-c}SiO_{1/2})_w(SiO_2)_z$$
$$|$$
$$O(CH_2)_4OCH=CH_2$$

having a viscosity of about 350 centipoise was added to 5.0 grams of the silicone vinylether copolymer of example 1 and mixed thoroughly. Next, about 0.20 grams the triflate catalyst was added to this mixture and the resulting mixture was stirred thoroughly. This bath was then coated on biaxially orientated polypropylene at a coating weight of approximately 0.7 g/m$^2$. Curing was carried out on a Fusion UV irradiator equipped with a H-Bulb with an irradiating power of 600 watt/inch squared. Cure was determined as described in the preceding examples. The resulting coating cured at a speed of about 350 ft/min.

Example 9

About 5.0 grams of a vinyl ether functional silicone resin having the general formula:

$$(R_{3-c}SiO_{1/2})_w(SiO_2)_z$$
$$|$$
$$O(CH_2)_4OCH=CH_2$$

having a viscosity of about 50,000 centipoise was added to 5.0 grams of the silicone vinylether copolymer of example 1 and mixed thoroughly. Next, about 0.20 grams of the triflate catalyst was added to this mixture and the resulting mixture was stirred thoroughly. This bath was then coated on biaxially orientated polypropylene at a coating weight of approximately 0.7 g/m$^2$. Curing was carried out on a Fusion UV irradiator equipped with a H-Bulb with an irradiating power of 600 watt/inch squared. Cure was determined as described in the preceding examples. The resulting coating cured at a speed of about 300 ft/min.

Examples 10–15

In the following examples the vinyl ether functional silicone resin (CRA) of Example 8 was added to the silicone vinylether copolymer of example 1 and mixed thoroughly. A diluent was then added to this mixture and the resulting solution was then stirred thoroughly. Next about 0.20 grams of the triflate catalyst was added to this mixture and the resulting mixture was stirred thoroughly. This bath was then coated on biaxially orientated polypropylene at a coating weight of approximately 0.7 g/m$^2$. Curing was carried out on a Fusion UV irradiator equipped with a H-Bulb with an irradiating power of 600 W/in$^2$. Cure was determined as described in the preceding examples. The types and amounts (in grams (g)) of Copolymer, CRA, and diluent are denoted in Table I hereinbelow. The cure rates of the resulting coatings are also denoted in Table I in ft/min.

TABLE I

| Component | Example 10 | Example 11 | Example 12 | Example 13 | Example 14 | Example 15 |
|---|---|---|---|---|---|---|
| Copolymer | 4.75 | 4.50 | 4.75 | 4.50 | 4.75 | 4.50 |
| CRA | 4.75 | 4.50 | 4.75 | 4.50 | 4.75 | 4.50 |
| diluent: | | | | | | |
| HDDVE | 0.50 | 1.00 | | | | |
| TMPTVE | | | 0.50 | 1.00 | | |
| HBVE | | | | | 0.50 | 1.00 |
| Cured at: (ft/min) | 200 | 325 | 350 | 365 | 90 | 75 |

Examples 16–29

In the following examples the vinyl ether functional silicone resin (CRA) of Example 8 was added to the silicone vinylether copolymer of example 1 and mixed thoroughly. A diluent was then added to this mixture and the resulting solution was then stirred thoroughly. Next about 0.20 grams of the triflate catalyst was added to this mixture and the resulting mixture was stirred thoroughly. The types and amounts (in grams (g)) of Copolymer, CRA, and diluent are denoted in Table II hereinbelow. This bath was then coated on biaxially orientated polypropylene (BOPP) at a coating weight of approximately 0.7 g/m². Curing was carried out on a Fusion UV irradiator equipped with a H-Bulb with an irradiating power of 600 W/in². The samples were prepared just prior to applying the coating to the film. The coated sheet was aged 1 day at room temperature prior to lamination. Laminated sheets were also aged 1 day at room temperature prior to running release. Release Speed was 400 inches per minute at a 180 degree peel. The samples were evaluated for release against TESA 7475 (acrylic tape), TESA 7476 (rubber tape), a hot melt adhesive, and water based acrylic tape. The release performance of the resulting coatings is shown in Table III in grams/inch.

(g)) of Copolymer, CRA, and diluent are denoted in Table IV hereinbelow. The Samples were prepared just prior to applying the coating to the film. The Samples were cured using a 600 Watt Fusion H Bulb. The Cure is recorded as line speed (ft/min) to no migration. The speed at which each coating cured is shown in Table V hereinbelow. The coated sheet was aged 1 day at room temperature prior to lamination. Laminated sheets were also aged 1 day at room temperature prior to running release. Release Speed was 400 inches per minute at a 180 degree peel. The samples were evaluated for release against TESA 7475 (acrylic tape), TESA 7476 (rubber tape), a hot melt adhesive, and water based acrylic tape. The release performance of the resulting coatings is shown in Table V in grams/inch.

TABLE II

| Example | Copolymer | CRA | Diluent amount | Diluent type |
| --- | --- | --- | --- | --- |
| 16 | 10.00 | 10.00 | | |
| 17 | 9.50 | | 0.50 | HDDVE |
| 18 | 9.00 | | 1.00 | HDDVE |
| 19 | 9.50 | | 0.50 | TMPTVE |
| 20 | 9.00 | | 1.00 | TMPTVE |
| 21 | 9.50 | | 0.50 | HBVE |
| 22 | 9.00 | | 1.00 | HBVE |
| 23 | 4.75 | 4.75 | 0.50 | HDDVE |
| 24 | 4.50 | 4.50 | 1.00 | HDDVE |
| 25 | 4.75 | 4.75 | 0.50 | TMPTVE |
| 26 | 4.50 | 4.50 | 1.00 | TMPTVE |
| 27 | 4.50 | 4.50 | 1.00 | TMPTVE |
| 28 | 4.75 | 4.75 | 0.50 | HBVE |
| 29 | 4.50 | 4.50 | 1.00 | HBVE |

TABLE IV

| Example | Copolymer | CRA | Diluent amount | Diluent Type |
| --- | --- | --- | --- | --- |
| 30 | 10.00 | | | |
| 31 | 9.50 | | 0.50 | HDDVE |
| 32 | 9.00 | | 1.00 | HDDVE |
| 33 | 9.50 | | 0.50 | TMPTVE |
| 34 | 9.00 | | 1.00 | TMPTVE |
| 35 | 9.50 | | 0.50 | HBVE |
| 36 | 9.00 | | 1.00 | HBVE |
| 37 | 5.00 | 5.00 | | |
| 38 | 4.75 | 4.75 | 0.50 | HDDVE |
| 39 | 4.50 | 4.50 | 1.00 | HDDVE |
| 40 | 4.75 | 4.75 | 0.50 | TMPTVE |
| 41 | 4.50 | 4.50 | 1.00 | TMPTVE |
| 42 | 4.75 | 4.75 | 0.50 | HBVE |
| 43 | 4.50 | 4.50 | 1.00 | HBVE |

TABLE III

| | Release Performance (grams/inch) | | | |
| --- | --- | --- | --- | --- |
| | Tesa 7475 | Tesa 7476 | Hot Melt | Water-based Acrylic |
| 16 | 17.5 | 14.6 | 11.7 | 11.2 |
| 17 | 12.6 | 12.0 | 9.0 | 5.9 |
| 18 | 15.1 | 12.6 | 10.8 | 8.2 |
| 19 | 12.1 | 12.2 | 9.8 | 4.8 |
| 20 | 19.7 | 14.1 | 10.9 | 6.9 |
| 21 | 13.4 | 12.3 | 12.3 | 6.2 |
| 22 | 16.5 | 14.1 | 15.4 | 5.2 |
| 23 | 53.1 | 37.0 | 58.8 | 23.9 |
| 24 | 51.8 | 34.7 | 53.9 | 21.7 |
| 25 | 39.6 | 20.3 | 50.0 | 18.4 |
| 26 | 63.6 | 43.6 | 60.1 | 27.0 |
| 27 | 49.0 | 35.3 | 58.4 | 28.8 |
| 28 | 46.9 | 29.1 | 60.9 | 17.0 |
| 29 | 48.0 | 33.3 | 55.9 | 12.0 |

TABLE V

| | | Release Performance (grams/inch) | | | |
| --- | --- | --- | --- | --- | --- |
| Example | CURE (ft/min) | Tesa 7475 | Tesa 7476 | Hot Melt | Water Based Acrylic |
| 30 | 175 | 11.6 | 11.1 | 10.7 | 4.9 |
| 31 | 150 | 12.8 | 11.5 | 11.1 | 4.6 |
| 32 | 200 | 10.6 | 11.0 | 11.0 | 4.7 |
| 33 | 175 | 17.6 | 16.0 | 16.0 | 9.0 |
| 34 | 225 | 14.1 | 10.1 | 11.0 | 9.0 |
| 35 | 125 | 11.2 | 10.8 | 10.5 | 5.4 |
| 36 | 75 | 9.4 | 8.9 | 9.9 | 4.7 |
| 37 | 75 | 36.7 | 20.8 | 40.8 | 18.1 |
| 38 | 75 | 45.1 | 20.2 | 45.0 | 29.6 |
| 39 | 125 | 46.6 | 17.2 | 47.2 | 33.6 |
| 40 | 150 | 43.1 | 20.2 | 45.9 | 18.8 |
| 41 | 100 | 66.3 | 20.5 | 44.5 | 19.0 |
| 42 | 125 | 43.1 | 19.7 | 41.4 | 22.1 |
| 43 | 100 | 38.8 | 23.1 | 39.4 | 20.9 |

Examples 30–43

Curable compositions containing the vinylether functional siloxanes and aromatic iodonium salts of the instant invention were evaluated for cure and release performance. In the following examples the vinyl ether functional silicone resin (CRA) of Example 8 was added to the silicone vinylether copolymer of example 1 and mixed thoroughly. A diluent was then added to this mixture and the resulting solution was then stirred thoroughly. Next about 0.20 grams of a diaryliodonium salt of para-toluene sulfonic acid catalyst was added to this mixture and the resulting mixture was stirred thoroughly then applied at a coat weight of approximately 0.7g/m² on BOPP. The types and amounts (in grams It should be apparent from the foregoing that many other variations and modifications may be made in the compounds, compositions and methods described herein without departing substantially from the essential features and concepts of the present invention. Accordingly it should be clearly understood that the forms of the invention described herein are exemplary only and are not intended as limitations on the scope of the present invention as defined in the appended claims.

That which is claimed is:

1. An article of manufacture prepared by a method comprising the steps of:

(I) applying a composition comprising
(A) a siloxane compound having the general formula:

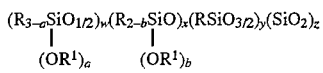

wherein R is a monovalent hydrocarbon radical or halohydrocarbon radical having from 1 to 20 carbon atoms, $R^1$ is selected from the group consisting of monovalent hydrocarbon or halohydrocarbon radicals having from 1 to 8 carbon atoms and a group having its formula selected from the group consisting of (i) —$R^2OCH=CH_2$ and (ii) —$R_2Si(OR^2OCH=CH_2)_{3-c}R_c$ wherein $R^2$ is a divalent hydrocarbon or halohydrocarbon radical having from 1 to 20 carbon atoms, c has a value of 0 to 2, R is as defined above, w is a mole percent of from greater than 0 to 100, x is a mole percent of from 0 to less than 100, y is a mole percent of from 0 to less than 100, z is a mole percent of from 0 to less than 100, a is an integer of from 0 to 3, b is an integer of from 0 to 2, the sum of w+x+y+z being equal to 100 mole percent, with the proviso that at least one $\equiv SiOR^2OCH=CH_2$ group or $\equiv SiOR^2Si(OR^2OCH=CH_2)_{3-c}R_c$ group exists in each compound; and
(B) a photoinitiator having its general formula selected from:

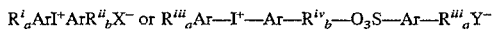

wherein $R^i$ is selected from monovalent hydrocarbon or halohydrocarbon radicals free of aliphatic unsaturation having from 1 to 40 carbon atoms, halogen atoms, a radical selected from $NO_2$, CN, COOH, $SO_3H$, or alkoxy radicals, hydrocarbon groups substituted with nitro groups, nitrile groups, carboxylic acid groups, sulfonic acid groups, or alkoxy groups, $R^{ii}$ is selected from monovalent hydrocarbon radicals free of aliphatic unsaturation and having from 1 to 40 carbon atoms, hydrocarbon groups substituted with alkoxy groups, arylalkoxy radicals, aryloxy radicals, or halogen atoms, each $R^{iii}$ is independently selected from monovalent hydrocarbon or halohydrocarbon radicals free of aliphatic unsaturation and having from 1 to 20 carbon atoms, halogen atoms, a radical selected from $NO_2$, CN, COOH, $SO_3H$, or alkoxy radicals, hydrocarbon groups substituted with nitro groups, nitrile groups, carboxylic acid groups, sulfonic acid groups, or alkoxy groups, $R^{iv}$ is selected from alkoxy radicals or aryloxy radicals, Ar denotes arene radicals having from 6 to 40 carbon atoms, a has a value of from 0 to 10, b has value of from 0 to 10, $X^-$ is an anion selected from the group consisting of perfluoroalkylsulfonic acid anions, tetrahaloboronic acid anions, tetrakis (perfluoroaryl)boronic acid anions, and tetrakisperfluoroalkylsulfonatoboronic acid anions, and $Y^-$ is an aryl sulfonate anion to a solid substrate to form a coating, and (II) exposing the coating to an energy source selected from the group consisting of (i) actinic radiation and (ii) actinic radiation in combination with heat in an amount sufficient to cure the coating.

2. An article of manufacture according to claim 1, wherein the article is further prepared by contacting a pressure sensitive adhesive composition with the substrate after step (II).

3. An article of manufacture according to claim 1, wherein the substrate is paper.

4. An article of manufacture according to claim 1, wherein the substrate is plastic film.

5. An article of manufacture according to claim 1, wherein R is selected from methyl or phenyl.

6. An article of manufacture according to claim 1, wherein $R^1$ is selected from methyl or a group having its formula selected from —$R^2OCH=CH_2$ or —$R^2Si(OR^2OCH=CH_2)_3$ wherein $R^2$ is selected from methylene, ethylene, propylene, butylene, hexylene, or cyclohexyldimethylene.

7. An article of manufacture according to claim 1, wherein Ar is selected from phenyl, naphthyl, anthracenyl, phenanthracenyl, pyrenyl, napthacenyl, 9,10-benzophenanthrenyl, chrysenyl, 1,2-benzanthracenyl, 3,4-benzophenanthrenyl, 3,4-benzopyrene, perylenyl, 1,2,3,4-dibenzanthracenyl, 1,2,5,6-dibenzanthracenyl, 1,2,6,7-dibenzoanthracenyl, 1,2,7,8-dibenzanthracenyl, 1,2,6,7-dibenzophenanthracenyl, 1,2,7,8-dibenzophenanthracenyl, pentacenyl, picenyl, coronenyl, 1,2,4,5-dibenzopyrene, hexacenyl, phenylhexadecenyl, or anthracenylhexacenyl.

8. An article of manufacture according to claim 1, wherein the monovalent hydrocarbon or halohydrocarbon radicals free of aliphatic unsaturation having from 1 to 40 carbon atoms of $R^i$ and $R^{ii}$ are each selected from methyl, ethyl, propyl, butyl, hexyl, octyl, decyl, cyclohexyl, phenyl, tolyl, xylyl, benzyl, phenylethyl, naphthyl, anthracenyl, phenanthracenyl, pyrenyl, napthacenyl, 9,10-benzophenanthrenyl, chrysenyl, 1,2-benzanthracenyl, 3,4-benzophenanthrenyl, 3,4-benzopyrene, perylenyl, 1,2,3,4-dibenzanthracenyl, 1,2,5,6-dibenzanthracenyl, 1,2,6,7-dibenzoanthracenyl, 1,2,7,8-dibenzanthracenyl, 1,2,6,7-dibenzophenanthracenyl, 1,2,7,8-dibenzophenanthracenyl, pentacenyl, picenyl, coronenyl, 1,2,4,5-dibenzopyrene, hexacenyl, phenylhexadecenyl, or anthracenylhexacenyl.

9. An article of manufacture according to claim 1, wherein the monovalent hydrocarbon or halohydrocarbon radicals free of aliphatic unsaturation having from 1 to 20 carbon atoms of $R^{iii}$ are independently selected from methyl, ethyl, propyl, butyl, hexyl, octyl, decyl, cyclohexyl, phenyl, tolyl, xylyl, benzyl, phenylethyl, naphthyl, anthracenyl, phenanthracenyl, pyrenyl, napthacenyl, 9,10-benzophenanthrenyl, chrysenyl, 1,2-benzanthracenyl, 3,4-benzophenanthrenyl, 3,4-benzopyrene, or perylenyl.

10. An article of manufacture according to claim 1, wherein the halogen atoms are selected from fluorine, chlorine, or bromine.

11. An article of manufacture according to claim 1, wherein the alkoxy radicals are selected from methoxy, ethoxy, propoxy, or butoxy.

12. An article of manufacture according to claim 1, wherein the hydrocarbon groups substituted with nitro groups are selected from 3—$O_2N$—$C_6H_4$ or 4—Cl,3—$O_2N$—$C_6H_3$.

13. An article of manufacture according to claim 1, wherein the hydrocarbon groups substituted with nitrile groups are selected from 4—NC—$C_6H_4$, 1—NC—$C_{10}H_7$, or 2—NC—$C_{10}H_7$.

14. An article of manufacture according to claim 1, wherein the hydrocarbon groups substituted with carboxylic acid groups are selected from 4—HOOC—$C_6H_4$ or 3—HOOC—$C_6H_4$.

15. An article of manufacture according to claim 1, wherein the hydrocarbon groups substituted with sulfonic acid groups are selected from 4—$HO_3S$—$C_6H_4$ or 3—$HO_3S$—$C_6H_4$.

16. An article of manufacture according to claim 1, wherein the hydrocarbon groups substituted with alkoxy groups are selected from 4—$CH_3O$—$C_6H_4$, 4—$C_2H_5O$—$C_6H_4$, 2—$CH_3O$—$C_6H_4$, or 2—$C_2H_5O$—$C_6H_4$.

17. An article of manufacture according to claim 1, wherein the arylalkoxy radicals are selected from benzyloxy and phenylethyloxy.

18. An article of manufacture according to claim 1, wherein the aryloxy radicals are selected from phenoxy or napthoxy.

19. An article of manufacture according to claim 1, wherein $X^-$ is selected from perfluorobutanesulfonic acid anions, perfluoroethanesulfonic acid anions, perfluorooctanesulfonic acid anions, trifluoromethanesulfonic acid anions, $BF_4^-$, $BCl_4^-$, $BBr_4^-$, $B(C_6F_5)_4^-$, $B(C_{10}F_7)_4^-$, $B(O_3SCF_3)_4^-$, $B(O_3SC_2F_5)_4^-$, or $B(O_3SC_4F_9)_4^-$.

20. An article of manufacture according to claim 1, wherein $X^-$ is trifluoromethanesulfonate.

21. An article of manufacture according to claim 1, wherein $Y^-$ is selected from p-toluenesulfonate, 4-methylphenylsulfonate, benzenesulfonate, dodecylbenzenesulfonate, or 3-nitrobenzenesulfonate.

22. An article of manufacture according to claim 1, wherein x has a value of zero.

23. An article of manufacture according to claim 22, wherein the composition of Step (I) further comprises an organopolysiloxane having the general formula:

wherein $R^8$ is a monovalent hydrocarbon radical having from 1 to 20 carbon atoms, $R^9$ is $R^8$ or is a group having its formula selected from the group consisting of (i) —$OR^{10}OCH=CH_2$ and (ii) —$R^{10}Si(OR^{10}OCH=CH_2)_{3-h}R^{11}_h$, wherein $R^{10}$ is a divalent hydrocarbon or halohydrocarbon radical having from 1 to 20 carbon atoms, h has a value of 0 to 2, $R^{11}$ is a monovalent hydrocarbon radical having from 1 to 20 carbon atoms, f has a value of 0 to 5000, g has a value of 0 to 800, with the proviso that at least one $\equiv SiOR^{10}OCH=CH_2$ or $\equiv SiR^{10}Si(OR^{10}OCH=CH_2)_{3-h}R^{11}_h$ group exists in each compound.

24. An article of manufacture according to claim 23, wherein the composition of step (I) further comprises an organic vinyl ether compound having the general formula:

wherein $R^3$ is a divalent hydrocarbon or halohydrocarbon radical having from 1 to 20 carbon atoms, $R^4$ is a monovalent hydrocarbon or halohydrocarbon radical having from 1 to 20 carbon atoms or hydrogen, and d has a value of 1 to 3.

25. An article of manufacture according to claim 23, wherein $R^8$ is methyl, $R^9$ is a group having the formula —$R^{10}Si(OR^{10}OCH=CH_2)_3$ wherein each $R^{10}$ is independently selected from the group consisting of methylene, ethylene, propylene, butylene, hexylene, and cyclohexyldimethylene.

26. An article of manufacture according to claim 25, wherein y has a value of zero and $R^1$ is selected from methyl or a group having the formula —$R^2OCH=CH_2$ wherein $R^2$ is selected from methylene, ethylene, propylene, butylene, hexylene, or cyclohexyldimethylene.

27. An article of manufacture according to claim 23, wherein y has a value of zero and $R^1$ is selected from methyl or a group having the formula —$R^2OCH=CH_2$ wherein $R^2$ is selected from methylene, ethylene, propylene, butylene, hexylene, or cyclohexyldimethylene.

28. An article of manufacture according to claim 1, wherein the composition of step (I) further comprises an organic vinyl ether compound having the general formula:

wherein $R^3$ is a divalent hydrocarbon or halohydrocarbon radical having from 1 to 20 carbon atoms, $R^4$ is a monovalent hydrocarbon or halohydrocarbon radical having from 1 to 20 carbon atoms or hydrogen, and d has a value of 1 to 3.

* * * * *